(12) United States Patent
George (10) Patent No.: US 7,155,008 B2
(45) Date of Patent: *Dec. 26, 2006

(54) POWER OFFLOADING FOR A SUBSCRIBER LINE INTERFACE CIRCUIT

(75) Inventor: Scott A. George, Walnut Creek, CA (US)

(73) Assignee: Silicon Laboratories, Inc., Austin, TX (US)

( * ) Notice: Subject to any disclaimer, the term of this patent is extended or adjusted under 35 U.S.C. 154(b) by 235 days.

This patent is subject to a terminal disclaimer.

(21) Appl. No.: 10/881,749

(22) Filed: Jun. 30, 2004

(65) Prior Publication Data

US 2006/0002219 A1    Jan. 5, 2006

(51) Int. Cl.
*H04M 19/00* (2006.01)
(52) U.S. Cl. ...................... 379/413; 379/401
(58) Field of Classification Search ......... 379/400–401
See application file for complete search history.

(56) References Cited

U.S. PATENT DOCUMENTS

| | | | | |
|---|---|---|---|---|
| 4,860,148 | A | * | 8/1989 | Iwamura et al. ............... 361/58 |
| 5,428,682 | A | * | 6/1995 | Apfel .......................... 379/413 |
| 5,737,411 | A | * | 4/1998 | Apfel et al. ................. 379/413 |
| 5,889,858 | A | | 3/1999 | Gancarcik et al. |
| 6,069,950 | A | | 5/2000 | Knollman |
| 6,542,605 | B1 | | 4/2003 | Israelsson et al. |
| 2006/0002545 | A1 | | 1/2006 | Goldenberg |

* cited by examiner

*Primary Examiner*—Daniel Swerdlow
(74) *Attorney, Agent, or Firm*—Davis & Associates; William D. Davis (57) ABSTRACT

A power offload network has a first node for receiving a first supply V1 and a second node for receiving a second supply V2. The power offload network includes a plurality of switches and a power offload element providing a supply drop of VR. The switches are configurable for selecting a linefeed supply level from the set including {V1, V2, V1–VR, V2–VR}. A subscriber line interface circuit receives the selected linefeed supply level for driving a subscriber line.

20 Claims, 6 Drawing Sheets

POWER OFFLOADING FOR A SUBSCRIBER LINE INTERFACE CIRCUIT

FIELD OF THE INVENTION

This invention relates to methods and apparatus for managing power for devices requiring supply levels that may vary, for example, in accordance with device operational state.

BACKGROUND OF THE INVENTION

A subscriber line interface circuit typically requires different power supply levels depending upon operational state. One supply level is required when the subscriber equipment is "on-hook" and another supply level is required when the subscriber equipment is "off-hook". Yet another supply level is required for "ringing".

In order to ensure sufficient supply levels, a power supply providing a constant or fixed supply level sufficient to meet or exceed the requirements of all of these states may be provided. Such a solution permits one or more SLICs to use a common power supply for at least two operational states.

One disadvantage of a shared fixed power supply architecture is that excess power is generated and must be dissipated as heat or otherwise wasted when a SLIC is not using a power supply level optimized for its particular operational state or for the particular line conditions. For example, the power supply must be capable of supporting the worst-case scenario such as a maximum subscriber line length provided for by specification. In the event the subscriber line is considerably shorter than the maximum expected length, the SLIC will be required to absorb the excess power. The resulting additional thermal load can be problematic for integrated circuits of the SLIC.

One alternative to sharing fixed power supplies is to provide a tracking power supply for each device. Each tracking power supply varies its supply level in accordance with the requirements of its associated device. This tracking power supply architecture is more power efficient than the shared fixed power supply architecture. Given that every device needs its own tracking power supply, however, the tracking power supply per device architecture may not be economical for a large number of SLICs.

SUMMARY OF THE INVENTION

In one embodiment, a power offload network has a node for receiving at least one supply V1. The power offload network includes at least one switch and a power offload element providing a supply drop of VR. The switch is configurable for selecting a linefeed supply level from the set including {V1, V1-VR}. A subscriber line interface circuit receives the selected linefeed supply level for driving a subscriber line.

In one embodiment, a power offload network has a first node for receiving a first supply V1 and a second node for receiving a second supply V2. The power offload network includes a plurality of switches and a power offload element providing a supply drop of VR. The switches are configurable for selecting a linefeed supply level from the set including {V1, V2, V1-VR, V2-VR}. A subscriber line interface circuit receives the selected linefeed supply level for driving a subscriber line.

In various embodiments, the switch(es) are configured to select the linefeed supply level in accordance with at least one of a subscriber line condition and a SLIC operational state.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
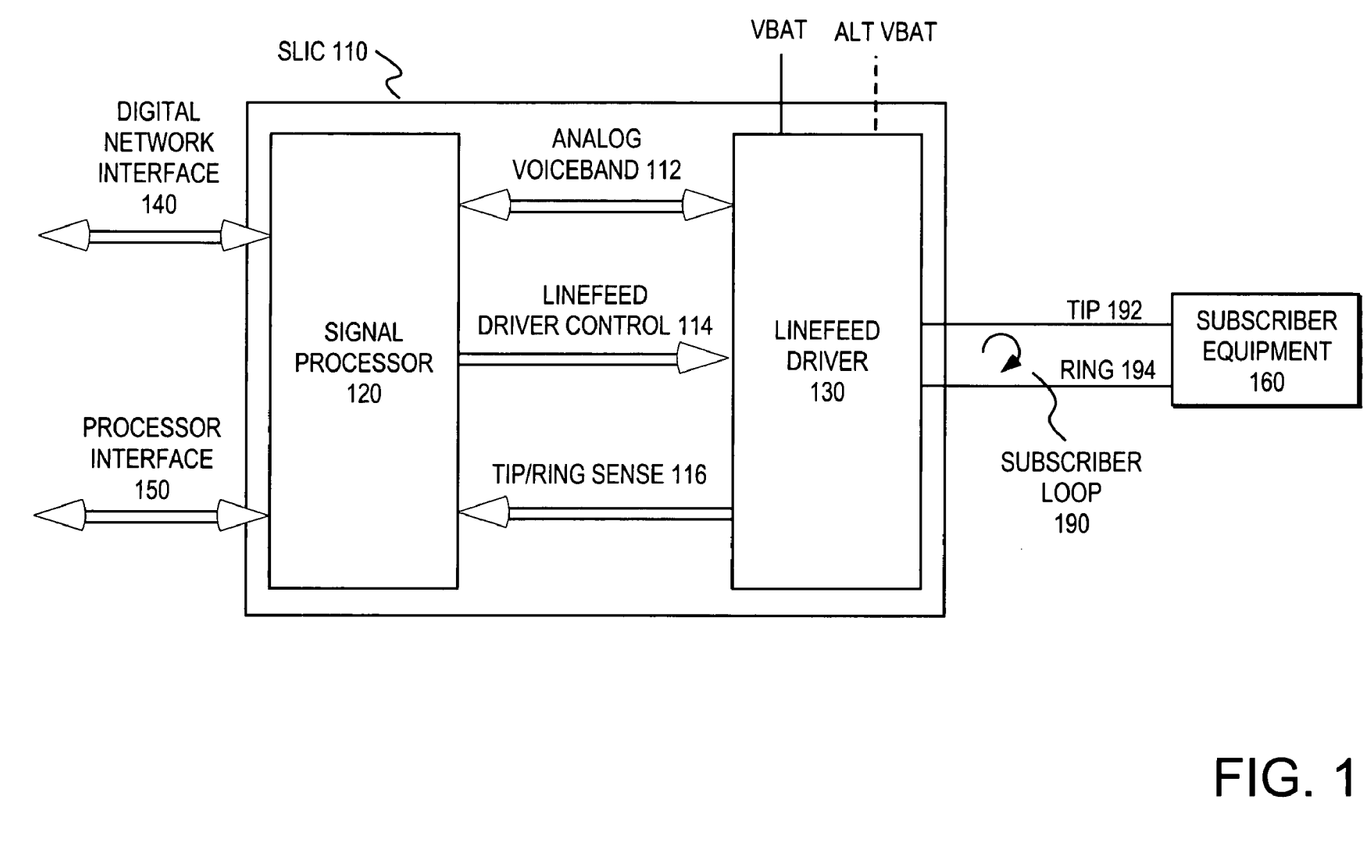
FIG. 1 illustrates one embodiment of a subscriber line interface circuit.

FIG. 1 illustrates one embodiment of a subscriber line interface circuit 110 associated with plain old telephone services (POTS) telephone lines. The subscriber line interface circuit (SLIC) provides an interface between a digital switching network of a local telephone company central exchange and a subscriber line comprising a tip 192 and a ring 194 line. A subscriber loop 190 is formed when the subscriber line is coupled to subscriber equipment 160 such as a telephone.

The subscriber loop 190 communicates analog data signals (e.g., voiceband communications) as well as subscriber loop "handshaking" or control signals. The subscriber loop state is often specified in terms of the tip 192 and ring 194 portions of the subscriber loop.

The SLIC is typically expected to perform a number of functions often collectively referred to as the BORSCHT requirements. BORSCHT is an acronym for "battery feed," "overvoltage protection," "ring," "supervision," "codec," "hybrid," and "test." The term "linefeed" will be used interchangeably with "battery feed". Modern SLICs may have battery backup, but the supply to the subscriber line is typically not actually provided by a battery.

The ring function, for example, enables the SLIC to signal the subscriber equipment 160. In one embodiment, subscriber equipment 160 is a telephone. Thus, the ring function enables the SLIC to ring the telephone.

In the illustrated embodiment, the BORSCHT functions are distributed between a signal processor 120 and a linefeed driver 130. Signal processor 120 is responsible for at least the ring control, supervision, codec, and hybrid functions. Signal processor 120 controls and interprets the large signal subscriber loop control signals as well as handling the small signal analog voiceband data and the digital voiceband data.

In one embodiment, signal processor 120 is an integrated circuit. The integrated circuit includes sense inputs for both a sensed tip and a sensed ring signal of the subscriber loop. The integrated circuit generates subscriber loop linefeed driver control signal in response to the sensed signals. The signal processor has relatively low power requirements and can be implemented in a low voltage integrated circuit operating in the range of approximately 5 volts or less.

Signal processor 120 receives subscriber loop state information from linefeed driver 130 as indicated by tip/ring sense 116. This information is used to generate linefeed driver control 114 signals for linefeed driver 130. Analog voiceband 112 data is bi-directionally communicated between linefeed driver 130 and signal processor 120.

SLIC 110 includes a digital network interface 140 for communicating digitized voiceband data to the digital switching network of the public switched telephone network (PSTN). The SLIC may also include a processor interface 150 to enable programmatic control of the signal processor 120. The processor interface effectively enables programmatic or dynamic control of battery control, battery feed state control, voiceband data amplification and level shifting, longitudinal balance, ringing currents, and other subscriber loop control parameters as well as setting thresholds including ring trip detection and off-hook detection threshold.

Linefeed driver 130 maintains responsibility for battery feed to tip 192 and ring 194. The battery feed and supervision circuitry typically operate in the range of 40–75 volts. In some implementations the ringing function is handled by the same circuitry as the battery feed and supervision circuitry. In other implementations, the ringing function is performed by higher voltage ringing circuitry (75–150 $V_{rms}$).

Linefeed driver 130 modifies the large signal tip and ring operating conditions in response to linefeed driver control 114 provided by signal processor 120. This arrangement enables the signal processor to perform processing as needed to handle the majority of the BORSCHT functions. For example, the supervisory functions of ring trip, ground key, and off-hook detection can be determined by signal processor 120 based on operating parameters provided by tip/ring sense 116.

The linefeed driver receives a linefeed supply VBAT for driving the subscriber line for SLIC "on-hook" and "off-hook" operational states. An alternate linefeed supply (ALT VBAT) may be provided to handle the higher voltage levels (75–150 Vrms) associated with ringing.

VBAT may be provided as a fixed supply level. Typically VBAT is shared among a plurality of SLICs. Each SLIC is associated with its own subscriber line. The line conditions may vary greatly from one subscriber line to another. One subscriber line may be considerably shorter than another, for example. Shorter length subscriber loops require less power to drive. VBAT, however, is selected to accommodate a worst-case scenario for driving the subscriber line. Excess power must be dissipated by the SLIC. Excess power results in an increased thermal load that may be problematic when the increased thermal load is carried by an integrated circuit.

Figure 2:
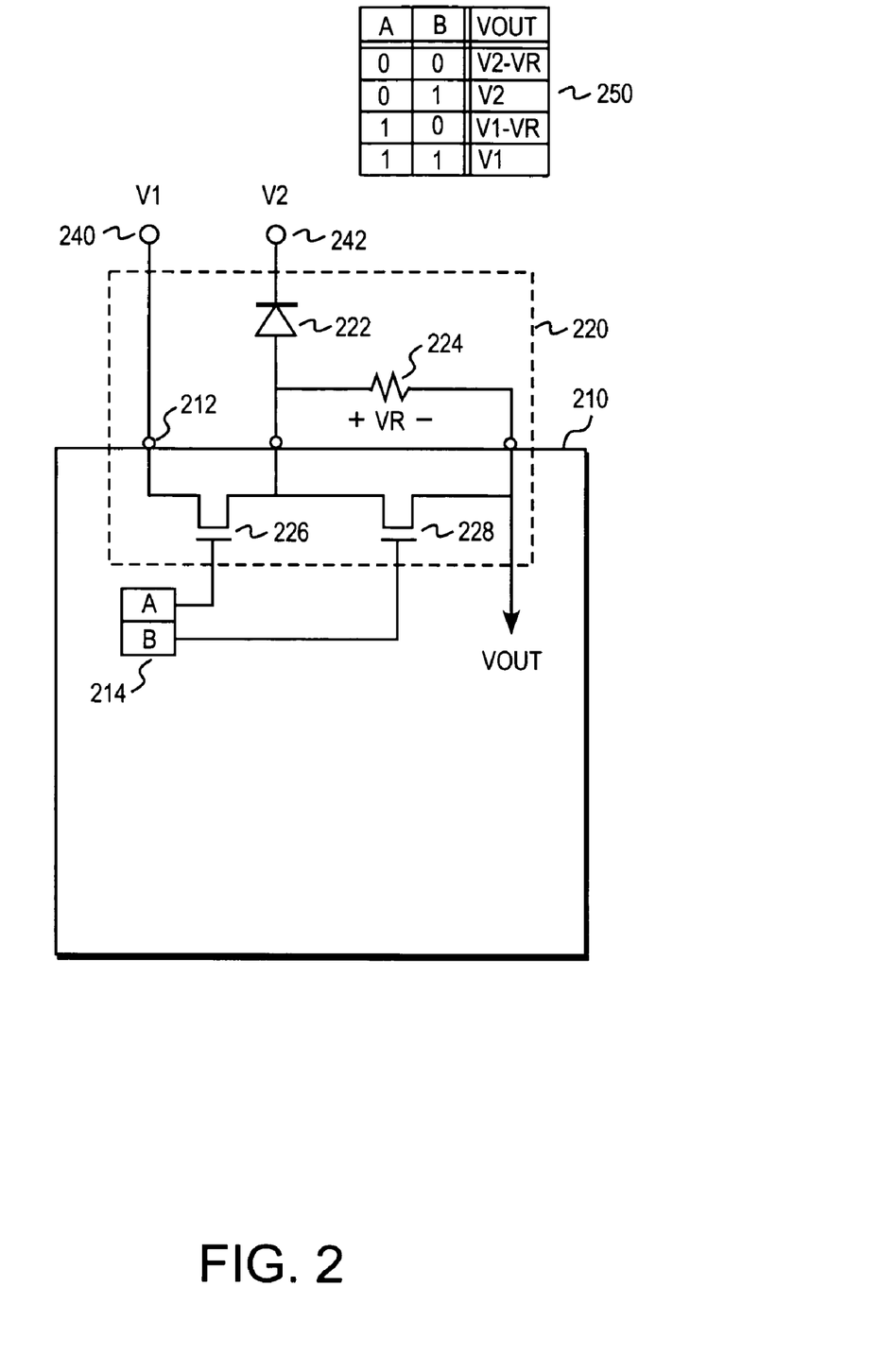
FIG. 2 illustrates one embodiment of power offload network.

FIG. 2 illustrates one embodiment of a power offload network 220 that may be used with SLIC applications. The power offload network has a first node 240 for receiving a first supply level, V1 and a second node 242 for receiving a second supply level, V2. In one embodiment, the first and second supplies are substantially independent. Thus although V1 and V2 may be derived from a common source, V1 and V2 are independent of each other (i.e., neither V1 nor V2 is derived from the other). The power offload network includes a power offload element 224 and a plurality of switches. In the illustrated embodiment, transistors 226 and 228 function as switches.

For a two supply application, the plurality of switches includes first and second switches. A first terminal of the first switch 226 is connected to the first node 240. A first terminal of the second switch 228 is connected to a second terminal of the first switch 226. The power offload element is coupled in parallel with the second switch. The first terminal of the second switch is diode-coupled (diode 222) to the second node 242. The linefeed supply is taken from the second terminal of the second switch.

The power offload network provides a supply level VOUT to integrated circuit 210. In one embodiment, integrated circuit 210 forms a portion of a subscriber line interface circuit and VOUT is a linefeed supply level. Although a portion of the power offload network 220 may be disposed within the integrated circuit 210, the power offload element 224 is external to the integrated circuit. The switches can be configured to permit offloading at least some of the excess power to the power offload element for consumption. The resulting thermal energy is also dissipated by the power offload element rather than the integrated circuit.

In the illustrated embodiment, a portion of the power offload network is located within the integrated circuit 210. In particular, transistors 226 and 228 are fabricated within the integrated circuit 210 and electrically coupled to the remainder of the power offload network through integrated circuit package pins such as pin 212.

Switches 226 and 228 may be controlled to select one of the two supply levels or one of the two supply levels reduced in magnitude by the voltage drop across the power offload element. This effectively permits four different supply levels from two supplies. Moreover, the cost of the components 222 and 224 are relatively small such that supply levels V1 and V2 may be shared with a plurality of integrated circuits, each integrated circuit having its own power offload network.

In order for diode 222 to protect the power supplies, node 240 is coupled to receive V1 and node 242 is coupled to receive V2 where V1<V2. In one embodiment of a SLIC application, V1≈−100V and V2≈−26V. Transistors 226 and 228 may be switched to provide four different supply levels for VOUT. In the illustrated embodiment, N-type metal-oxide-semiconductor transistors are used as switches. In alternative embodiments, other transistor types may be used as switches.

In one embodiment, the gates of transistors 226 and 228 are controlled by bits A and B of a memory element such as register 214. Other types of memory or control lines may be used for controlling these switches.

Using the symbol "0" to denote that the transistor is not permitting any substantial conduction (i.e., "off") and "1" to denote that the transistor is permitting substantial conduction (i.e., "on"), the following supply levels can be realized as indicated by Table 250 of FIG. 2:

| A | B | VOUT |
|---|---|------|
| 0 | 0 | V2 − VR |
| 0 | 1 | V2 |
| 1 | 0 | V1 − VR |
| 1 | 1 | V1 |

Generally, bits A controls selection between power supplies V1 and V2. Bit B determines whether the power offload element is selected to absorb Excess power. Thus values for bits A and B can be changed in accordance with static or dynamic line conditions, operational state of the integrated circuit, or even in response to the thermal status of integrated circuit 210 (i.e., enable power offload if the integrated circuit temperature exceeds a pre-determined threshold). The use of a memory element such as a register permits programmatic control of the power offload network.

In the illustrated embodiment, the power offload element comprises a resistor. VR is dependent upon the resistance of the resistor as well as the supply level selected. The power offload element is selectable and provides a non-zero voltage drop when selected.

Bit A may be dynamically changed to switch between V1 when ringing, for example, and V2 when on-hook or off-hook. Bit B may be changed to further reduce (in magnitude) the supply level by VR to accommodate line conditions such as short loop as necessary. Bit A may be considered a coarse selector for selecting the supply. Bit B further reduces the supply level by VR when selected. Thus V1 might be selected for long loop ringing while V1−VR is selected for short loop ringing. Similarly, V2 might be selected for on-hook and long loop off-hook operational states while V2−VR is selected for short loop off-hook SLIC operational states and subscriber line conditions.

Figure 3:
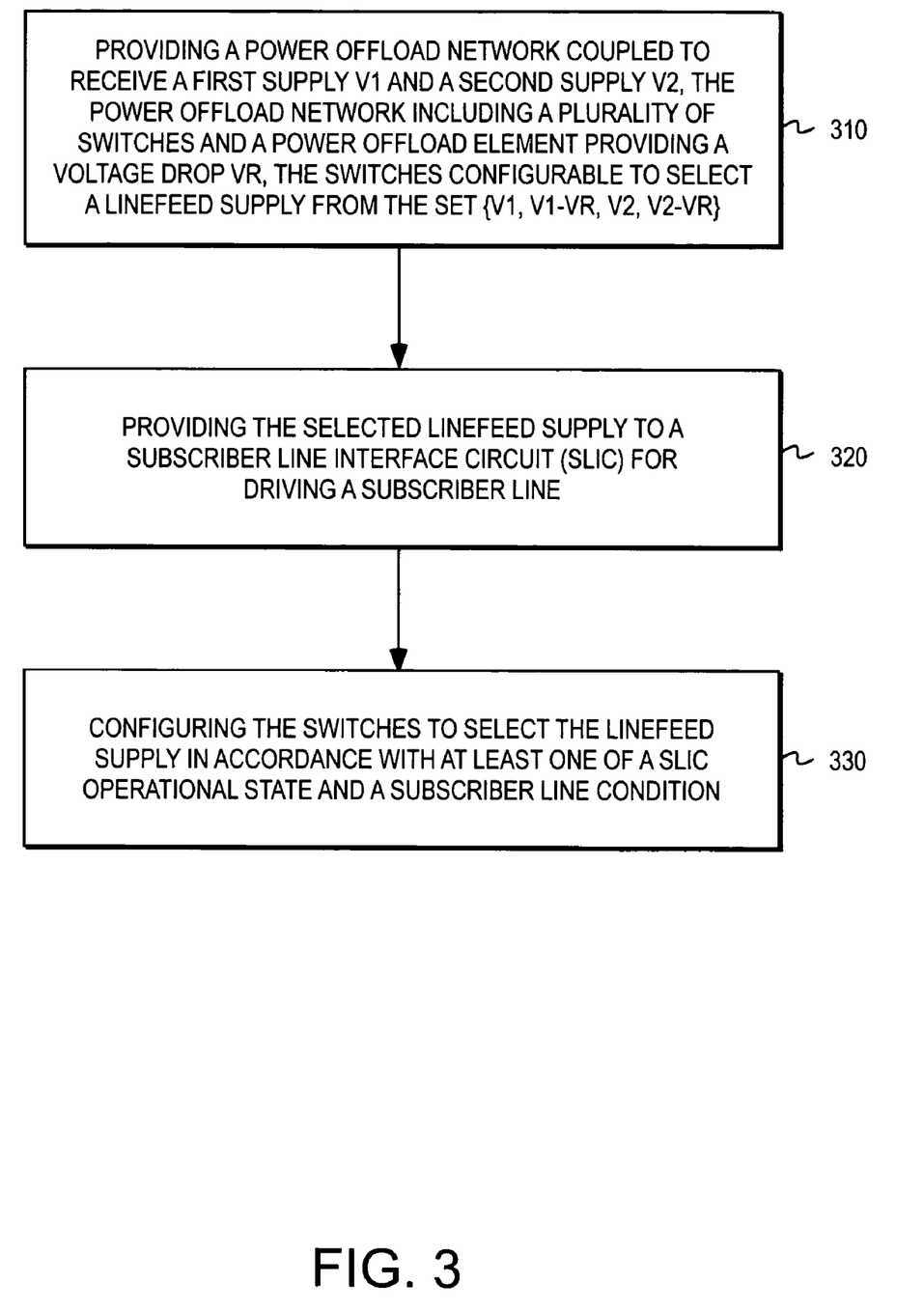
FIG. 3 illustrates one embodiment of a method for configuring a power offload network having a plurality of supplies.

FIG. 3 illustrates one embodiment of a method for offloading power. A power offload network coupled to receive a first supply V1 and a second supply V2 is provided in step 310. The power offload network includes a plurality of switches and a power offload element providing a voltage drop VR. The switches are configurable to permit selecting a linefeed supply level from the set {V1, V1−VR, V2, V2−VR}.

A subscriber line interface circuit receives the selected linefeed supply level for driving a subscriber line in step 320. In step 330, the switches are configured to select the linefeed supply level in accordance with at least one of a subscriber line condition and a SLIC operational state. One switch, for example, may be controlled by the subscriber line condition while another switch is controlled by a SLIC operational state.

The power offload network may be extended to include more than two supplies. A power offload network may alternatively be utilized in a single supply application.

Figure 4:
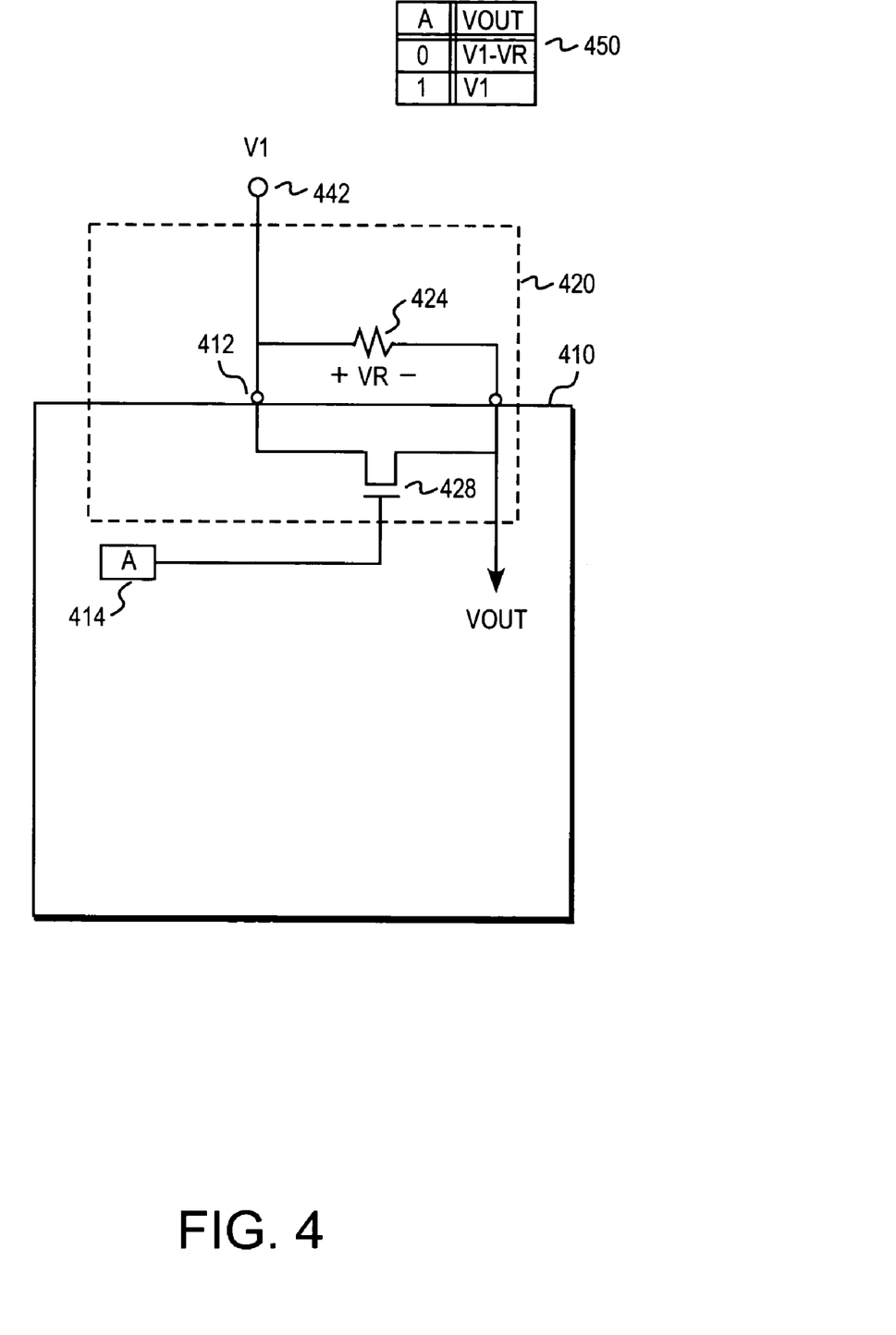
FIG. 4 illustrates one embodiment of a power offload network for a single supply.

FIG. 4 illustrates one embodiment of a single supply power offload network 420. The power offload network has a node 442 for receiving a supply level, V1. The power offload network includes a power offload element 424 and a switch. In the illustrated embodiment, transistor 428 functions as a switch.

The power offload network provides a supply level VOUT to integrated circuit 410. In one embodiment, integrated circuit 410 forms a portion of a subscriber line interface circuit and VOUT is a linefeed supply level. The power offload element 424 is external to the integrated circuit. In the illustrated embodiment, the switch (i.e., transistor 428) is fabricated within the integrated circuit 410 and electrically coupled to the remainder of the power offload network through integrated circuit package pins such as pin 412.

In the illustrated embodiment the switch is controlled by an associated bit A of register 414. Switch 428 selects VOUT from the set {V1, V1−VR} where VR is a supply drop provided by the power offload element. The value for bit A can be changed in accordance with static or dynamic line conditions, operational state of the integrated circuit, or even in response to the thermal status of the integrated circuit (i.e., magnitude of VOUT is decreased if the integrated circuit exceeds a temperature threshold). VR may be zero when the power offload element is not selected to prevent unnecessary power consumption. When the power offload element is selected, however, VR is non-zero.

Thus in one embodiment, the power offload network has a node for receiving a supply V1. The power offload network includes a power offload element providing a supply drop of VR. A switch is configurable to select a linefeed supply level from the set including {V1, V1−VR}. A SLIC receives the selected linefeed supply level for driving a subscriber line. In various embodiments, the switch is configured in accordance with an operational state of the SLIC or a subscriber line condition.

Figure 5:
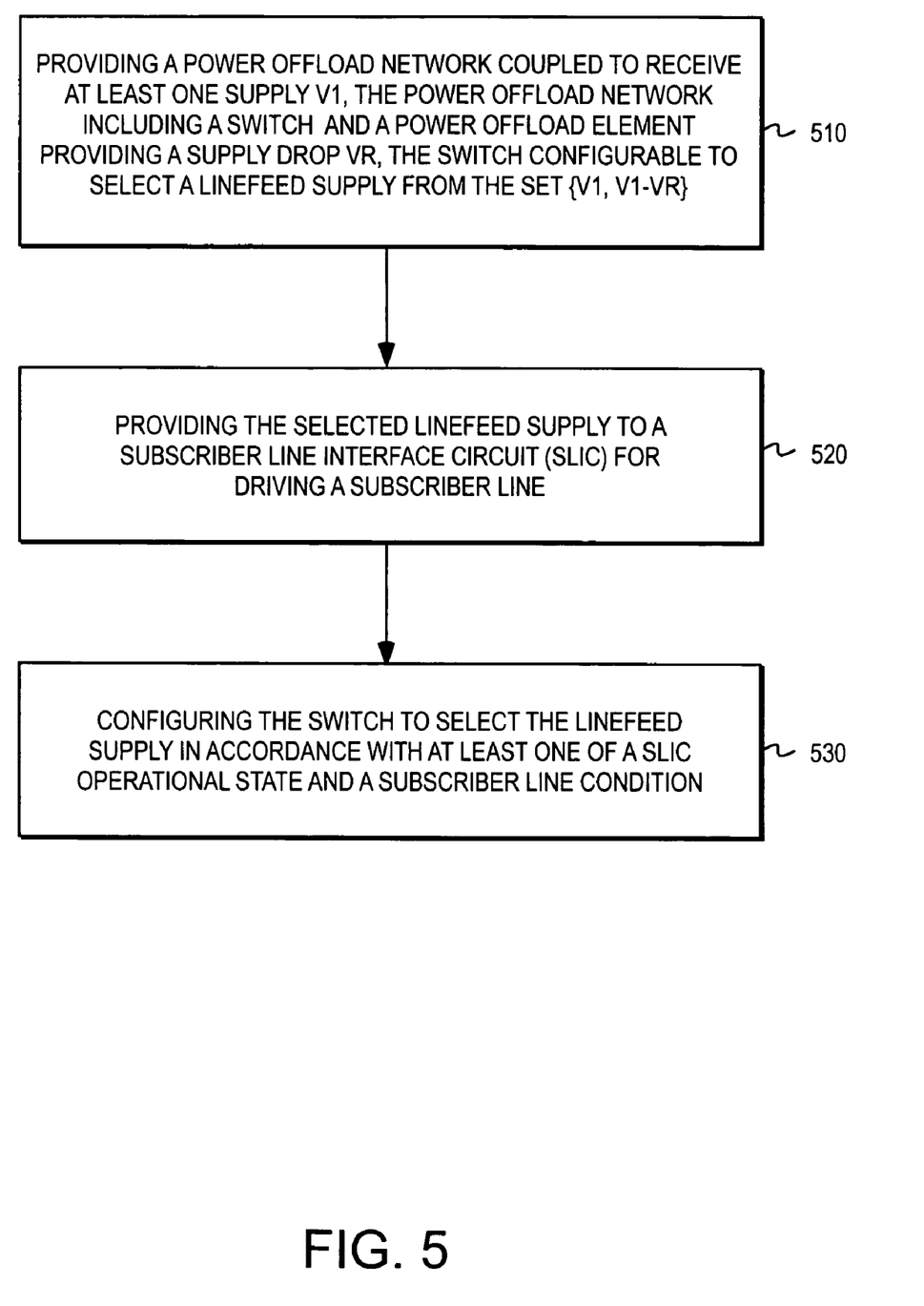
FIG. 5 illustrates one embodiment of a method for configuring a power offload network having at least one supply.

FIG. 5 illustrates one embodiment of a method for configuring a power offload network having at least one supply. A power offload network coupled to receive at least one supply V1 is provided in step 510. The power offload network includes a switch and a power offload element providing a supply drop VR. The switch permits selecting a linefeed supply level from the set including {V1, V1−VR}.

A SLIC receives the selected linefeed supply level for driving the subscriber line in step 520. In step 530, the switch is configured to select the linefeed supply level in accordance with at least one of the subscriber line condition and the SLIC operational state. Thus V1−VR might be selected for on-hook and short-loop off-hook while V1 is selected for long-loop off-hook subscriber line conditions and SLIC operational states.

The power offload element is embodied as a resistor in FIGS. 2 and 4. Alternative embodiments may include elements in addition to or in lieu of a resistor. For example, a regulator may be used to restrict the supply level provided to the integrated circuit.

Figure 6:
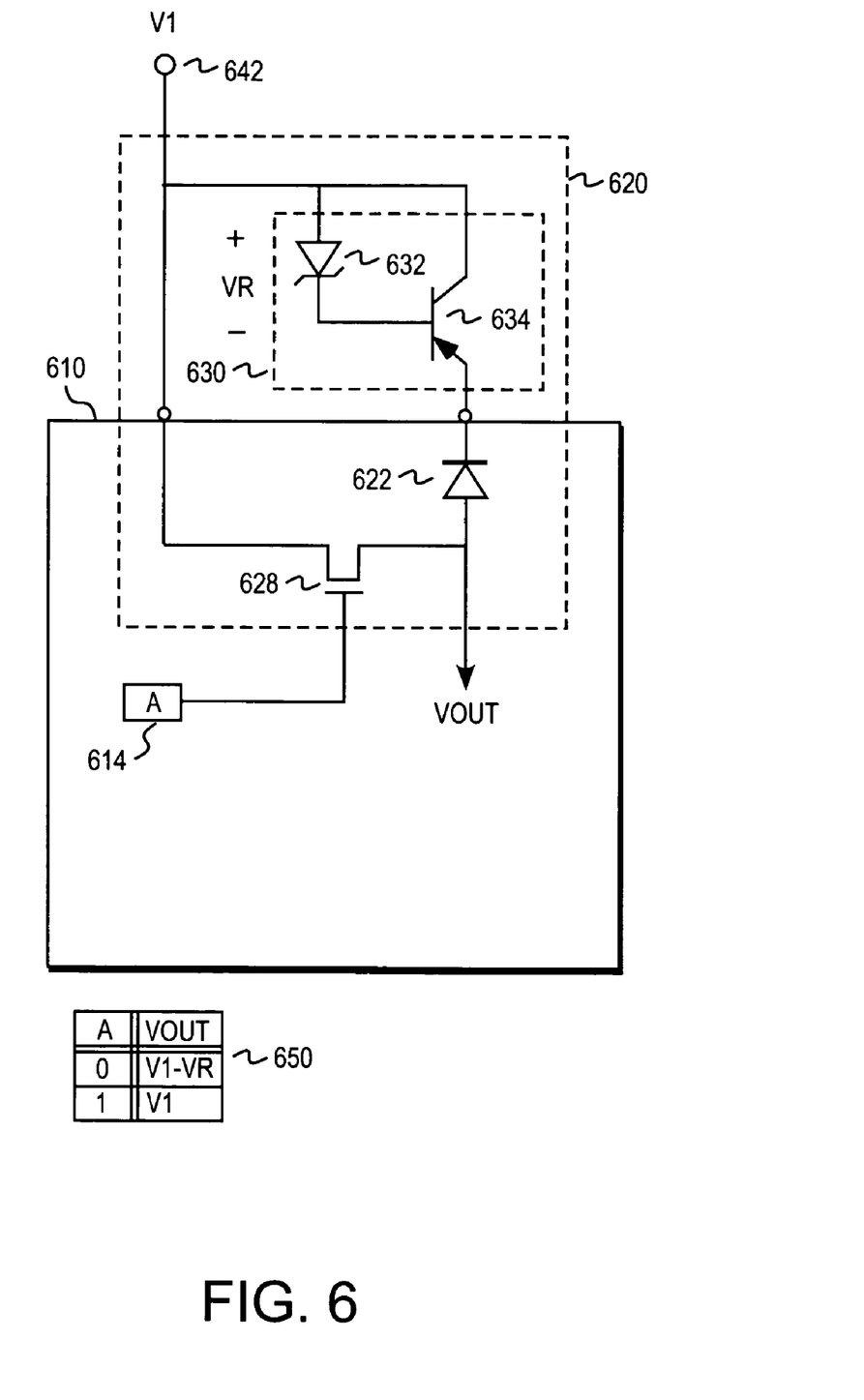
FIG. 6 illustrates an alternative embodiment of a power offload network.

FIG. 6 illustrates an alternative embodiment of a power offload network 620. The power offload network has a node 642 for receiving a supply level, V1. The power offload network includes a power offload element 630 and a switch 628. In the illustrated embodiment, transistor 628 functions as a switch. The power offload element comprises a zener diode 632 regulating a transistor 634 that is coupled to receive V1.

The power offload network provides a supply level VOUT to integrated circuit 610. In one embodiment, integrated circuit 610 forms a portion of a SLIC and VOUT is a linefeed supply level. For SLIC applications, V1 is a negative supply. The power offload element 630 is external to the integrated circuit.

In the illustrated embodiment, the switch 628 is controlled by an associated bit A of register 614. Switch 628 selects VOUT from the set {V1, V1−VR} where VR is a supply drop provided by the power offload element 630.

When switch 628 is conducting, diode 622 ensures that the power offload element has no effect and thus VOUT=V1. When switch 628 is not conducting, however, VOUT=V1−VR where VR is the supply drop provided by the power offload element. Zener diode 632 and transistor 634 absorb the excess power.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of managing power supply levels comprises the steps of:

a) providing a power offload network coupled to receive a first supply V1 and a second supply V2, wherein the power offload network includes a plurality of switches and a power offload element providing a supply drop VR, wherein the switches are configurable to select a linefeed supply level from the set including {V1, V2, V1−VR, V2−VR}; and b) providing the selected linefeed supply to a subscriber line interface circuit for driving a subscriber line.

2. The method of claim 1 further comprising:

c) configuring the switches to provide an appropriate linefeed supply level in accordance with a selected operational state of the subscriber line interface circuit.

3. The method of claim 2 wherein the subscriber line interface circuit has a plurality of operational states including on-hook, off-hook, and ringing.

4. The method of claim 1 comprising:

c) configuring the switches to provide an appropriate linefeed supply level in accordance with a subscriber line condition.

5. The method of claim 4 wherein the subscriber line exhibits one of a long loop and a short loop subscriber line condition.

6. The method of claim 1 further comprising:

c) configuring the switches to provide an appropriate linefeed supply level in accordance with at least one of a selected operational state of the subscriber line interface circuit and a subscriber line condition.

7. An apparatus comprising:

a power offload network having a first node for receiving a first supply V1 and a second node for receiving a second supply V2, wherein V1≠V2, the power offload network including a plurality of switches and a power offload element providing a supply drop of VR, the switches configurable to select a linefeed supply level from the set comprising {V1, V2, V1−VR, V2−VR}; and a subscriber line interface circuit coupled to receive the selected linefeed supply level for driving a subscriber line.

8. The apparatus of claim 7 wherein the switches are configured in accordance with a selected operational state of the subscriber line interface circuit to select the linefeed supply level.

9. The apparatus of claim 8 wherein the subscriber line interface circuit has a plurality of operational states including on-hook, off-hook, and ringing.

10. The apparatus of claim 7 wherein the switch network is configured in accordance with a subscriber line condition to select the linefeed supply level.

11. The apparatus of claim 10 wherein the subscriber line exhibits one of a long loop and a short loop subscriber line condition.

12. The apparatus of claim 7 wherein the switch network is configured in accordance with both an operational state of the subscriber line interface circuit and a subscriber line condition to select the linefeed supply level.

13. The apparatus of claim 7 wherein the switches are disposed within an integrated circuit.

14. The apparatus of claim 13 wherein each switch comprises a transistor.

15. The apparatus of claim 14 wherein the integrated circuit further comprises a register, wherein each switch is controlled by an associated bit of the register.

16. The apparatus of claim 13 wherein the power offload element is disposed external to the integrated circuit.

17. The apparatus of claim 7 wherein the switches include first and second switches, wherein a first terminal of the first switch is connected to the first node, wherein a first terminal of the second switch is connected to a second terminal of the first switch, wherein the power offload element is coupled in parallel with the second switch, wherein the first terminal of the second switch is diode-coupled to the second node, wherein the second terminal of the second switch provides the linefeed supply.

18. The apparatus of claim 7 wherein the power offload element is a resistor.

19. The apparatus of claim 7 wherein the power offload element includes a transistor.

20. The apparatus of claim 7 wherein the power offload element includes a diode.

* * * * *